No. 884,468. PATENTED APR. 14, 1908.
S. G. COOK.
ADDING MACHINE.
APPLICATION FILED MAY 22, 1905.
2 SHEETS—SHEET 1.
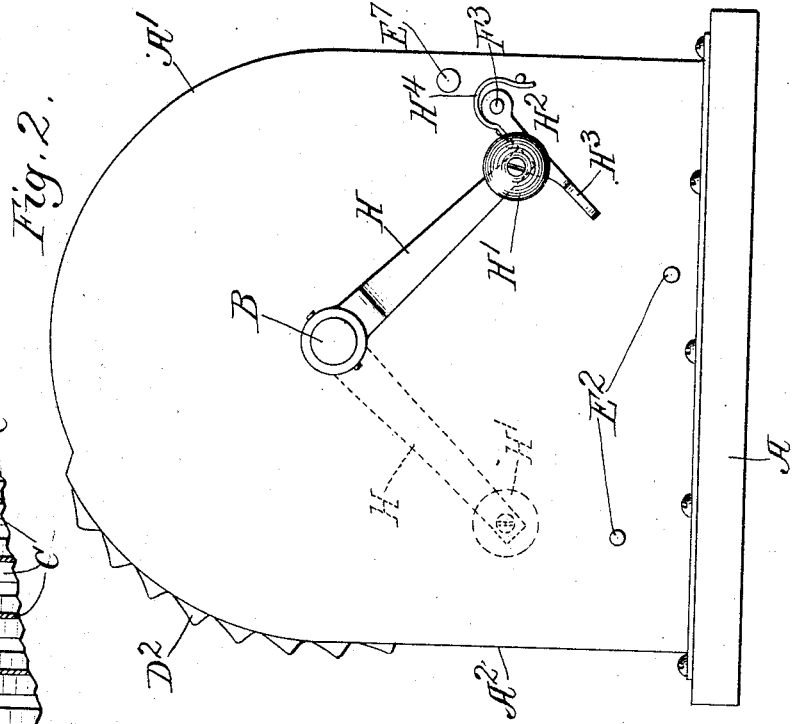
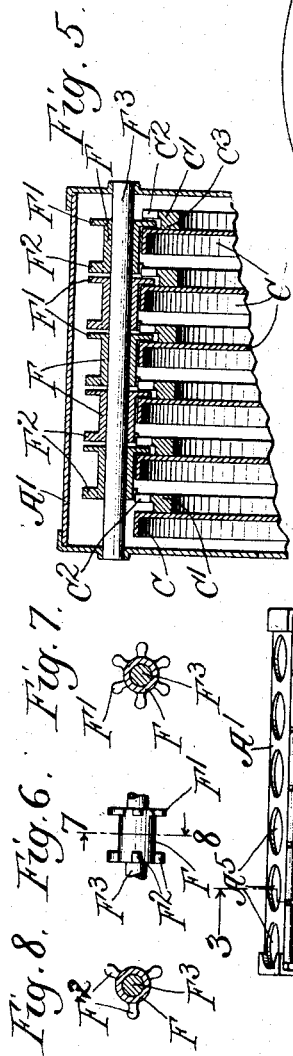
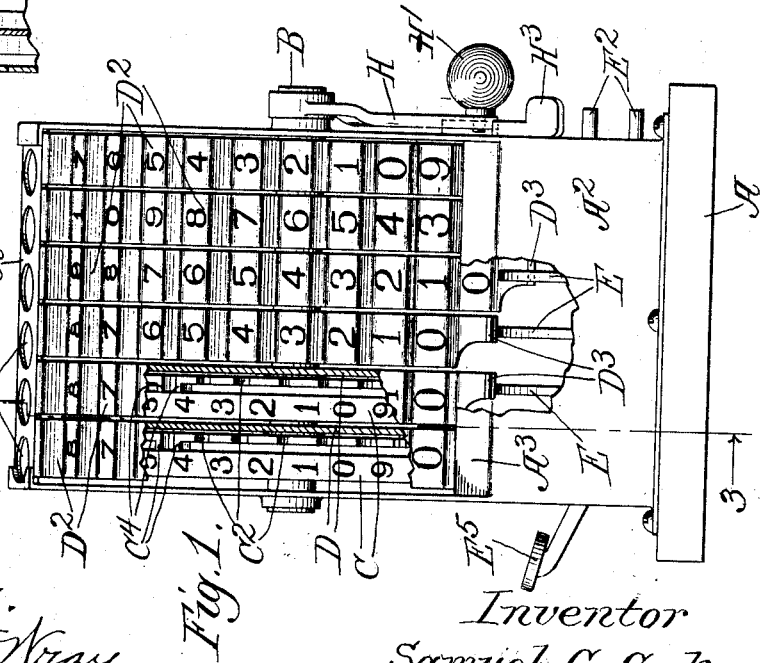
Witnesses.
Edward T. Wray
Percival H. Truman
Inventor
Samuel G. Cook
by Parker Parker
Attorneys.

No. 884,468. PATENTED APR. 14, 1908.
S. G. COOK.
ADDING MACHINE.
APPLICATION FILED MAY 22, 1905.
2 SHEETS—SHEET 2.
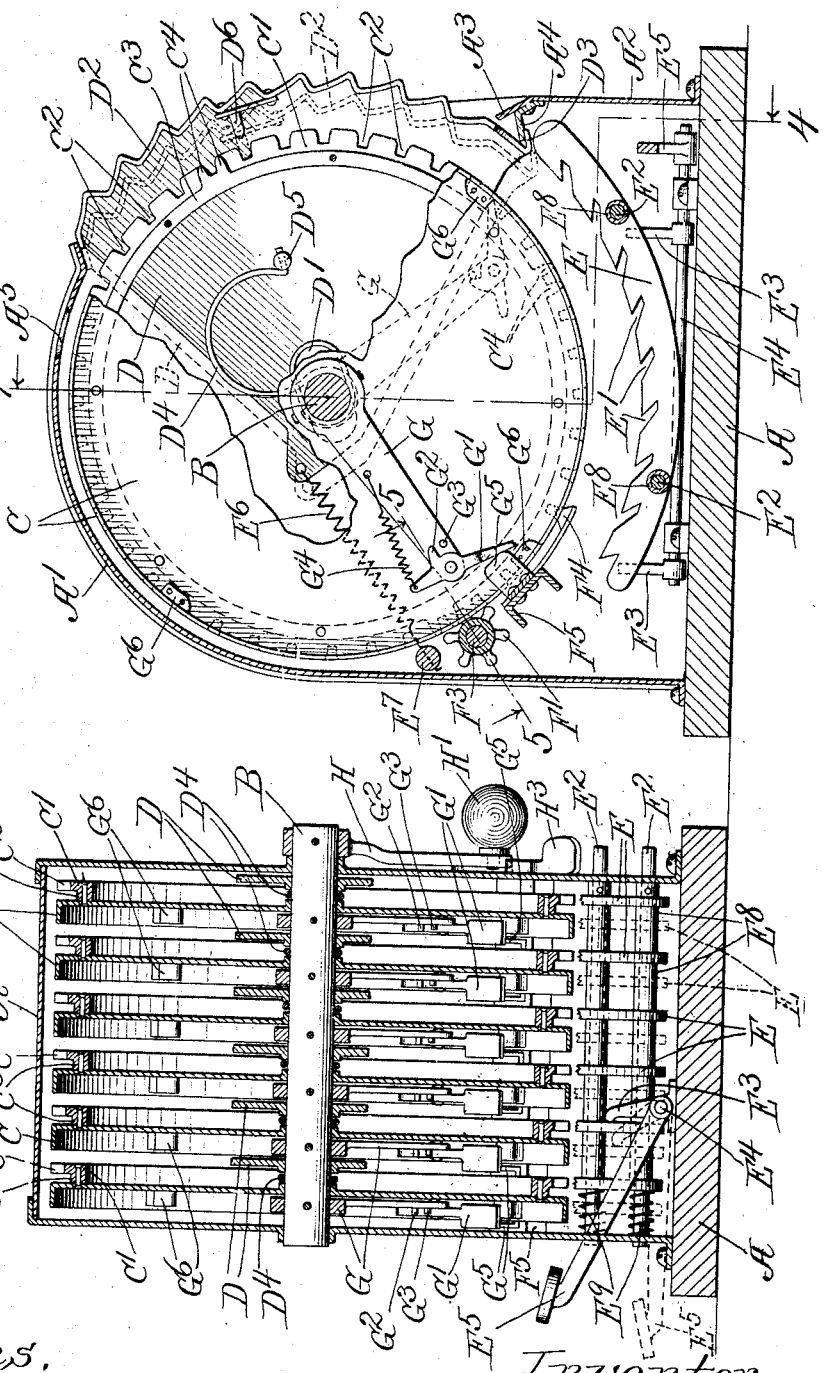
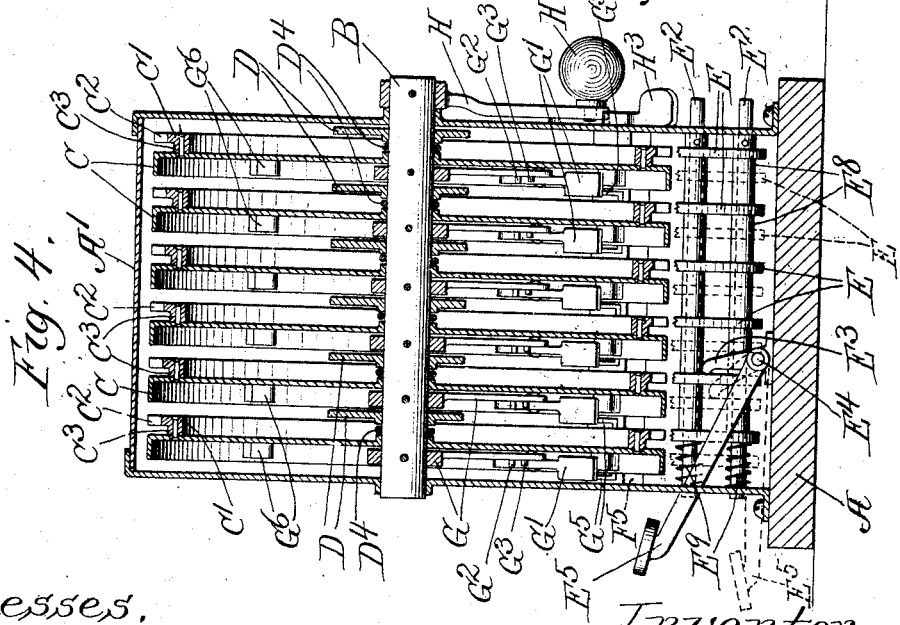
Witnesses,
Edward T. Wray
Prival H Truman
Inventor.
Samuel G. Cook.
by Parker Carter
Attorneys.

UNITED STATES PATENT OFFICE.

SAMUEL G. COOK, OF EAST ST. LOUIS, ILLINOIS, ASSIGNOR TO HIMSELF, TRUSTEE.

ADDING-MACHINE.

No. 884,468.　　　　Specification of Letters Patent.　　　Patented April 14, 1908.

Application filed May 22, 1905. Serial No. 261,541.

*To all whom it may concern:*

Be it known that I, SAMUEL G. COOK, a citizen of the United States, residing at East St. Louis, in the county of St. Clair and State of Illinois, have invented a certain new and useful Improvement in Adding-Machines, of which the following is a specification.

My invention relates to improvements in adding machines, and has for its object to provide new and improved constructions for devices of that class.

The invention is illustrated in the accompanying drawings wherein

Figure 1 is a front elevation with parts broken away, Fig. 2, an end elevation, Fig. 3, a sectional view on line 3—3 of Fig. 1, Fig. 4, a sectional view on line 4—4 of Fig. 3, Fig. 5, a detail section on line 5—5 of Fig. 3, Fig. 6, a side view of the double ended pinion, and Figs. 7 and 8, sections on line 7—8 of Fig. 6 looking in opposite directions.

Like letters of reference indicate like parts in all the drawings.

A represents a base part. To the base is secured a casing comprising a back and top part $A^1$ and a front part $A^2$ terminating in an inwardly turned rim $A^3$, to which is secured the hook $A^4$. In the top of the casing are the perforations $A^5$, there being one of these for each order of digits.

Journaled in the casing, is the transverse shaft B on which are mounted loosely a number of totalizing disks, there being one of these for units, one for tens, one for hundreds, etc. according to the capacity of the machine. As these disks and the related mechanisms are alike in each instance, it will be necessary to describe only one of them. The disk indicated by the letter C is preferably circular in form and has on its periphery the characters of the decimal system, zero to nine inclusive, there being preferably several sets of these figures. In the present instance I have shown four sets. Secured to the disk C is a gear-wheel $C^1$ having forty notches $C^2$ $C^2$ spaced apart about double the width of the notches, and an annular off-set $C^3$ between the notched part and the disk having in the present instance four pairs of teeth $C^4$ arranged at equal intervals on its periphery which I term engaging members.

To manipulate each of the totalizers, I provide an increment key consisting of a sector D having an elongated hole $D^1$ by means of which it is loosely mounted on the shaft B, carrying on its periphery the indented part $D^2$ forming a series of ten finger pieces numbered from the bottom up, zero to nine inclusive. The part $D^2$ is provided at its lower end with the hook $D^3$ normally engaging the hook $A^4$ of the case. A spring $D^4$ engaging at one end with the shaft B and at the other with a stud $D^5$ on the sector D tends to keep the sector in its forward position. To the inside of the finger part $D^2$ and normally opposite one of the notches $C^2$ on the gear-wheel $C^1$ is a tooth or pin $D^6$. By pressing the finger piece of the increment key inwardly, this tooth engages the notch and by depressing the increment key the totalizing disk is given a forward rotation. Beneath the sector is the rack E having the notches $E^1$, the rack being secured to two sliding shafts $E^2$ $E^2$ loosely mounted in the frame work of the machine. The hook $D^3$ of the increment key will engage one or other of these notches when the hand of the operator is removed. It will be understood, of course, that there are several of these racks E, one for each increment key. The racks, it will be seen, come up close under the hook or projection $A^4$ on the front of the case, leaving just space enough for the hooks $D^3$ on the ends of the increment keys. The ends of the racks E and the projecting part $A^4$, therefore, form a guide for the increment keys so that when these are depressed their movement will be substantially toward the center shaft B until the tooth $D^6$ has come into engagement with the proper notch on the totalizer. It is, therefore, impossible to rotate the increment key to any appreciable extent until the engagement of the totalizer is effected and the possibility of error on this account is entirely avoided. The notches $E^1$ on the racks act in the same way if it is desired to move the increment key a second time. In each case accuracy of operation is insured. Furthermore over rotation is prevented as the withdrawal of the tooth $D^6$ caused by the springing out of the increment key when the finger has reached the stop $A^3$ will itself stop the rotation of the totalizer. During the first part of the outward movement of the increment key the tooth $D^3$ will remain in engagement with the notch in the totalizer arresting the rotation of the totalizer. It is not possible by any careless operation to throw the totalizer beyond its proper stopping place. Furthermore, the action of the increment keys on the totalizer wheels is immediate and positive and without the interposition of any intermediate gearing. In effect the wheel is turned by the hand of the operator. The rack E may be moved to release the increment key by sliding the shafts $E^2$ $E^2$. This is done through the agency of the fingers $E^3$ $E^3$ on the rock shaft $E^4$ suitably mounted on the base A and to which is secured the release key $E^5$. When freed by depressing the release key, the increment key is returned to its normal position by means of the spiral spring $E^6$ connecting an off-set on the sector with the stud $E^7$ on the case. It will be understood, of course, that there is a rack for each increment key and an increment key for each totalizer. The several racks may be spaced on the shafts $E^2$ $E^2$ by means of the sleeves $E^8$ $E^8$. Spiral springs $E^9$ $E^9$ return the racks and the release key to their respective normal positions.

I will now describe the mechanisms by means of which motion is transmitted from a totalizer to the one next in order above it. F is a pinion having at one end the six toothed spur $F^1$ and at the other, the three toothed spur $F^2$. There are a series of these pinions loose on the shaft $F^3$ and arranged so that the six toothed ends are in the path of the notch formed by the pairs of teeth $C^4$ on the gear-wheel of each totalizer, while the three toothed end is adapted, when the pinion is rotated, to engage with the notches on the forty notched part of the gear-wheel connected with the totalizing disk of the next higher order of digits. By this arrangement, when the units totalizing disk, let us say, has been turned ten places from its zero position, the next totalizer in order, that is the tens disk, will be rotated one step. This motion is imparted to the tens disk only as the units disk moves from its nine position to its adjacent zero position. The same arrangement and result prevails throughout the device. A spring catch $F^4$ secured to the channel bar $F^5$ limits the motion of the disks. It will, of course, be understood that there will be no need of the gear-wheel $C^1$ on the lowest or units totalizer and also on the highest order disk there would be no need of the pairs of teeth $C^4$.

To reset the totalizers after the sum has been computed, I provide a series of arms G rigidly secured to the shaft B, there being one for each totalizer. Pivoted to the end of each of these arms is the dog $G^1$ having a lug $G^2$ to abut against the stop pin $G^3$ on the arm, the dog being outwardly pressed by means of the spring $G^4$. In its normal position, the dog is forced inwardly by the trip $G^5$ on the channel bar $F^5$. On the totalizing disk C are the lugs $G^6$ $G^6$, one for each set of digits, and arranged so as to be shielded by the trip when the totalizing disk stands in any of its zero positions. When the disk is rotated, however, these lugs come into the path of the dog. The shaft B is provided with the crank H having the handle $H^1$ and normally held in position by the spring catch $H^2$ comprising a finger piece $H^3$ pivoted to the shaft $C^4$ and the spring $H^4$. When the crank is released from the catch, the shaft B may be rotated and the dog $G^1$ will thereupon engage with the lug $G^2$ on the corresponding totalizer, provided the latter has been rotated from its zero position, and will return the totalizer to such position.

I have thus described with some detail one form of my invention, but it will be obvious that there might be considerable change made in the various devices and apparatus shown without departing from the spirit of my invention, and, therefore, I do not wish to limit myself to the particular forms and structures herein shown, but desire that the drawings be taken as in a sense diagrammatic and as illustrating one particular form of apparatus where many modifications are possible.

The use and operation of my invention are as follows: Suppose one was computing a sum of which the desired increment was 139. At the beginning of the sum the several totalizers will be arranged so that zeros will be read through the apertures $A^5$ $A^5$ in the top of the case. In the instance supposed, the totalizers will already have been moved so as to make a reading. The operator will now place his finger on the indentation numbered one of the increment key for hundreds, press inwardly and then downwardly until the motion of the key is stopped by the rim $A^3$ of the case. The tooth $D^6$ will have engaged a notch on the gear-wheel connected with the hundreds totalizer, moving the same one step. The digit showing through the aperture over the hundreds totalizer will be increased by one. A similar operation will be performed in the tens and units column with the proper change in the totalizers next above, provided the sum in either of the orders of digits exceeds nine. The several increment keys are retained by the rack device so that the number forming the increment to the sum may be read on the lower line of figures formed by the increment keys. The release key $E^5$ is then pressed and the increment keys returned to their normal positions and if the sum is then completed, the totalizers are also returned to zero by turning the shaft B.

It will be observed that there is in effect but one increment key for each order of digits and that the action of the increment key on the totalizers is positive. The arrangement of the figures on the totalizing disks so that the digits from zero to nine are repeated permits the increment keys to be moved over arcs considerably shorter than full circles so that the machine may be operated from one side entirely. It is an advantage also to be able to read the total amount of each increment before the keys are returned to their normal position.

I claim:

1. In an adding machine, the combination of a totalizer with an increment key to operate the same, a plurality of digits on the increment key, such key being movable so as to bring any one of the digits to a certain position, and an engaging device to hold the increment key in its position, comprising a hook on the end of the increment key and a movable rack.

2. In an adding machine, the combination of a totalizer disk having a plurality of complete sets of digits with a normally disengaged increment key movable coaxially therewith, and having a single set of digits.

3. In an adding machine, the combination of a circular totalizer disk with a plurality of complete sets of digits on its periphery, a normally disengaged coaxially movable increment key comprising a member with a set of digits arranged thereon in an arc less than a complete circle.

4. In an adding machine, the combination of a plurality of increment keys having each a series of digits thereon, means for moving the increment keys so that digits of any combination are brought into alinement, means comprising hooks associated with such keys, movable racks for retaining the increment keys in said alined position, and a release key with associated mechanisms adapted to move the racks and free the keys.

5. In an adding machine, the combination of a plurality of increment keys comprising sectors with series of digits peripherally thereon, with means for rotating the sectors so as to bring any combination of digits into alinement, a device for holding the keys in such position, comprising hooks on such sectors, a plurality of racks movable simultaneously, and a release key with associated mechanism adapted to move such racks laterally out of engagement with the hooks.

6. In an adding machine, the combination of a plurality of increment keys having each a series of digits thereon adapted to be moved so as to bring any combination of digits into alinement, with a plurality of totalizers having each a series of digits thereon, such totalizers adapted to be operated by immediate engagement with the increment keys so as to bring into alinement simultaneously with the alinement of the increment number the proper combination of digits to form the sum of such increment and the previous increments.

7. In an adding machine, the combination of a casing with a display opening, a totalizer with display figures thereon arranged so as to register successively with the display opening, and an increment key comprising a plurality of finger pieces for a series of digits, said increment key being movable concentrically with the totalizer and engaging immediately therewith.

8. In an adding machine, the combination of a totalizer with an increment key comprising a plurality of finger pieces for a series of digits, said increment key being movable concentrically therewith to operate the same, said increment key being normally out of engagement with said totalizer.

9. In an adding machine, the combination of a totalizer with an increment key depressible and mounted so that when depressed it moves into engagement with the totalizer and revolves the same.

10. In an adding machine, the combination of a totalizer with an increment key to operate the same revoluble concentrically therewith and mounted so as to move to and from its axis of rotation.

11. In an adding machine, the combination of a totalizer with an increment key comprising a plurality of finger pieces for a series of digits, said increment key being normally out of engagement with the totalizer, said increment key being mounted so as to be movable into engagement with the totalizer and to rotate so as to carry with it such totalizer.

12. In an adding machine, the combination of a totalizer with an increment key yieldingly mounted so as to stand over and out of engagement with the totalizer and adapted to be depressed into engagement therewith.

13. In an adding machine, the combination of a totalizer with an increment key comprising a rim part, the rim part adapted to stand over and out of engagement with the totalizer, said increment key depressible so as to engage with such totalizer.

14. In an adding machine, the combination of a totalizer with an increment key comprising an engaging part standing over said totalizer and a spring to normally hold said engaging part out of engagement with the totalizer.

15. In an adding machine, the combination of a totalizer with a depressible increment key yieldingly mounted so as to normally stand out of engagement with the increment key and adapted to engage immediately with the totalizer when depressed.

16. In an adding machine, the combination of a revoluble totalizer with a depressible yieldingly mounted and revoluble increment key adapted by a single depressing movement of the finger to engage with and move the totalizer.

17. In an adding machine, the combination of a revoluble totalizer with an increment key revoluble concentrically therewith and movable to and from its center of rotation so as to be brought in and out of engagement with the totalizer.

18. In an adding machine, an operating increment key rotatable and depressible toward its center of rotation and comprising an extended continuous surface with depressions therein to form finger pieces.

19. In an adding machine, an operating increment key rotatable and depressible toward its center of rotation, comprising an extended continuous surface with depressions therein to form finger pieces and a plurality of figures in the depressions.

20. In an adding machine, the combination of a wheel with a revoluble key mounted so as to be movable to and from its center of rotation, an engaging part on the key to engage with the wheel, and means for preventing the rotation of the key until the engaging part has been brought into engagement with the wheel.

21. In an adding machine, the combination of a wheel having peripheral notches therein, with a revoluble key mounted so as to be movable to and from its center of rotation, a tooth on the key to engage with the notches of the wheel, and means for preventing the rotation of the key until the engaging part has been brought into engagement with the wheel.

22. In an adding machine, the combination of a revoluble totalizer with a revoluble increment key movable toward its center of rotation so as to engage with the totalizer, and means for preventing the rotation of the increment key until it has come into engagement with the totalizer.

23. In an adding machine, the combination of a plurality of totalizers, increment keys to operate such totalizers by immediate engagement therewith, and a series of figures on each of the increment keys arranged so that when the increment keys are moved to various positions certain of the figures are combined to make a reading of the increment.

24. In an adding machine, the combination of a plurality of totalizers with a plurality of increment keys normally disengaged from but adapted to engage immediately with the totalizers to operate the same, and a series of figures on the increment keys arranged so that when the increment keys are moved to various positions certain of the figures are combined to make a reading while the totalizers are moved to make a reading of the sum.

25. In an adding machine, the combination of a case with a display opening therein, a plurality of totalizers within such case, increment keys, one for each totalizer, comprising strips of material arranged in the front of the case and having a downward throw into the case, and a series of figures on each of the increment keys arranged so that when the increment keys are moved to operate the totalizers, the line of figures showing above the case will give a reading of the increment.

26. In an adding machine, the combination of a case with a plurality of operating increment keys at the front of the case and having a downward throw therein, and a series of figures on each of the increment keys, said figures being arranged so that when the increment keys are operated to add a given number the lower line of figures will give a reading of the increment so added.

27. In an adding machine, the combination of a case with a plurality of operating increment keys at the front of the case depressible inwardly and having a downward throw therein, and a series of figures on each of the increment keys, said figures being arranged so that when the increment keys are operating to add a given number the lower line of figures on the increment keys will give a reading of the increment so added.

28. In an adding machine, the combination of a totalizer with an increment key depressible into engagement with the totalizer and movable therewith to operate the same, said increment key having an exterior rim part with a plurality of figures thereon adapted to be brought into a reading position by movement of said increment key.

29. In an adding machine, the combination of a shaft, a totalizer disk on the shaft so that the said totalizer and increment key have a common axis of rotation, an increment key comprising a plate mounted by means of an elongated opening upon said shaft, said increment key being movable on the shaft into engagement with the totalizer and rotatable about such shaft.

30. In an adding machine, the combination of a shaft, a totalizer disk on the shaft, an increment key comprising a plate mounted by means of an elongated opening upon said shaft so that said totalizer and increment key have a common axis of rotation, said increment key being movable on the shaft into engagement with the totalizer and rotatable about such shaft, and a spring normally holding said increment key out of engagement with the totalizer.

31. In an adding machine, the combination of a shaft, a totalizer disk on the shaft, an increment key comprising a plate mounted by means of an elongated opening upon said shaft, said increment key being movable on the shaft into engagement with the totalizer and rotatable about such shaft, and a spring to return the increment key to its zero position.

32. In an adding machine, the combination of a shaft, a totalizer disk on the shaft, an increment key comprising a plate mounted by means of an elongated opening upon said shaft, said increment key being movable on the shaft into engagement with the totalizer and rotatable about such shaft, and means for preventing the rotation of the increment key until it has come into engagement with the totalizer.

33. In an adding machine, the combination of a totalizer with a depressible increment key to operate the same, said key being mounted and guided so as first to move toward its center of rotation and then to revolve about such center by a single depressing movement of the finger.

34. In an adding machine, the combination of a totalizer with a depressible increment key to engage with and move the totalizer, said increment key being mounted and guided so as first to move toward its center of rotation and then to revolve about its center by a single depressing movement of the finger.

35. In an adding machine, the combination of a plurality of increment keys comprising a plurality of adjacent strips of material, finger pieces formed by depressions in the surfaces of such strips of material, a series of figures on each of said increment keys, and means for moving such keys so that any given combination of figures may be brought into alinement to make a reading of the increment.

36. In an adding machine, the combination of a plurality of increment keys comprising a plurality of adjacent strips of material, finger pieces formed by depressions in the surfaces of such strips of material, a series of figures on each of said increment keys, means for moving such keys so that any given combination of figures may be brought into alinement to make a reading of the increment, and means for retaining such keys in such positions.

37. In an adding machine, the combination of a plurality of increment keys comprising a plurality of adjacent strips of material, finger pieces formed by depressions in the surfaces of such strips of material, a series of figures on each of said increment keys, means for moving such keys so that any given combination of figures may be brought into alinement to make a reading of the increment, means for retaining such keys in such positions, and means for releasing such keys and returning the same to their zero positions.

38. In an adding machine, the combination of a plurality of increment keys comprising a plurality of adjacent strips of material, finger pieces formed by depressions in the surfaces of such strips of material, a series of figures on each of said increment keys, means for moving such keys so that any given combination of figures may be brought into alinement to make a reading of the increment, and means for retaining the keys in such position comprising a series of hooks on the keys and movable racks with which the hooks engage.

39. In an adding machine, the combination of a casing having an open front part, a plurality of totalizers within such casing, and increment keys to operate said totalizers, said increment keys comprising strips of material forming finger pieces lying one next to the other and normally closing the front of such case.

40. In an adding machine, the combination of a casing having an open front part, a plurality of totalizers within such casing, increment keys to operate such totalizers, said increment keys comprising strips of material forming finger pieces lying one next to the other and normally closing the front of such casing, said keys having a downward throw into the casing, and a rim part on the casing beneath the increment keys forming a stop.

41. In an adding machine, the combination of a plurality of totalizer disks having peripheral display figures with a plurality of increment keys circumferentially arranged with respect to the disks for operating the same and having figures to make a reading of the increment.

42. In an adding machine, the combination of a plurality of totalizers having display figures thereon, said totalizers adapted to be moved so as to combine the display figures into a reading of the sum, with a plurality of increment keys having display figures thereon to actuate said totalizers and adapted to be set to make a reading of each increment in the sum, said increment keys normally disengaged from but adapted to engage immediately with the totalizers to move the same.

43. In an adding machine, the combination of a plurality of totalizer disks having peripheral display figures, a case extending over said disks with a display aperture with which the figures of the totalizer disks register, a plurality of increment keys one for each totalizer disk and means for operatively connecting the increment keys with their respective totalizers, said increment key comprising finger pieces lying along the front of said casing.

44. In an adding machine, the combination of a plurality of totalizer disks having peripheral display figures, a case extending over said disks with a display aperture with which the figures of the totalizer disks register, and a plurality of increment keys, one for each disk, having series of display figures thereon, said increment keys adapted to engage immediately with the totalizers and comprising strips of material forming finger pieces lying along the front of such casing.

45. In an adding machine, the combination of a plurality of totalizer disks having peripheral display figures, a casing extending over said disks with a display aperture with which the figures of the totalizer disks register, and a plurality of depressible increment keys, one for each disk, having series of display figures thereon, said increment keys normally disengaged from but adapted to engage immediately with the totalizers and comprising strips of material forming finger pieces lying along the front of such casing.

46. In an adding machine, the combination of a plurality of totalizer disks having peripheral display figures, a case extending over such disks, with a display aperture with which the figures of the totalizer disks register, and a plurality of increment keys normally standing out of engagement with the totalizers, movable by a depressing movement of the finger into engagement with such totalizers and revoluble therewith and comprising finger pieces lying along the front of such casing.

47. In an adding machine, the combination of a plurality of totalizer disks having peripheral display figures, a case extending over said disks with a display aperture with which the figures of the totalizer disks register, and a plurality of increment keys, one for each disk, elastically mounted, normally standing out of engagement with the totalizer disks and adapted to be moved by a simple pressure of the fingers into operating relation with the totalizer disks, such increment keys comprising finger pieces lying along the front of such casing.

48. In an adding machine, the combination of a plurality of totalizer disks having peripheral display figures, a case extending over said disks with a display aperture with which the figures of the totalizer disks register, and a plurality of increment keys, one for each disk, said increment keys normally disengaged from but adapted to engage immediately with the totalizers and comprising finger pieces lying along the front of said casing having thereon display figures adapted to be set to make a reading of the increment.

49. In an adding machine, the combination of a plurality of totalizer disks having peripheral display figures, a case extending over said disks with a display aperture with which the figures of the totalizer disks register, a plurality of increment keys normally out of engagement with the totalizer disks and movable so as to engage and rotate with the same, and means associated with the case for preventing the rotation of the increment keys until they are in engagement with the totalizers.

SAMUEL G. COOK.

Witnesses:
C. R. HISSRICH,
E. R. HISSRICH.